Jan. 2, 1951 H. W. SANFORD ET AL Re. 23,319

MAGAZINE FEED STOVE

Original Filed Nov. 29, 1941 4 Sheets-Sheet 1

Hugh W. Sanford INVENTORS
and William P. Biddle Jr.
By Cyrus Kehr & Swecker
Attorneys Jan. 2, 1951 H. W. SANFORD ET AL Re. 23,319

MAGAZINE FEED STOVE

Original Filed Nov. 29, 1941 4 Sheets-Sheet 2

Hugh W. Sanford Inventors
and
William P. Biddle Jr.

By Cymes Kehr & Swacker

Attorneys

Jan. 2, 1951 H. W. SANFORD ET AL Re. 23,319

MAGAZINE FEED STOVE

Original Filed Nov. 29, 1941 4 Sheets-Sheet 3

Inventors
Hugh W. Sanford and
William P. Biddle Jr.
By Cymes Kehr & Swecker
Attorney

MAGAZINE FEED STOVE

Original Filed Nov. 29, 1941 4 Sheets-Sheet 4

Inventors

Hugh W. Sanford and
William P. Biddle Jr.

By Cyrus Keller & Swecker

Attorneys

Reissued Jan. 2, 1951 Re. 23,319

UNITED STATES PATENT OFFICE 23,319

MAGAZINE FEED STOVE

Hugh W. Sanford and William P. Biddle, Jr., Knoxville, Tenn., assignors, by direct and mesne assignments, to Sandebond Patents, Inc., Knoxville, Tenn., a corporation of Delaware Original No. 2,403,829, dated July 9, 1946, Serial No. 421,066, November 29, 1941. Application for reissue June 17, 1947, Serial No. 755,106

40 Claims. (Cl. 110—29)

Matter enclosed in heavy brackets [ ] appears in the original patent but forms no part of this reissue specification; matter printed in italics indicates the additions made by reissue

This invention relates to an improvement in magazine feed stoves of the character designed for the burning of coal, particularly soft coal, either in small sizes or in lumps.

Several magazine feed stoves have been proposed heretofore, but difficulty has been encountered with these designs in more than one respect. In the first place, when soft coal is used, the coal in the magazine hopper, when fresh fire is started, is soon penetrated by the heat of the fire, with the result that all the volatile matter in the coal is discharged quite rapidly. With a hundred pound charge of fuel in the magazine, the volatile matter is completely out of the fuel within probably an hour to one and one-half hours from the time the fire starts burning. This rapid discharge of the volatile matter has the result of making the operation of the stove exceedingly smoky during this initial period. Second, it is almost impossible to burn this excess volatile matter at one time efficiently, and a large part of the heat is wasted up the chimney.

In the third place, during the coking of the fuel by discharging the volatile matter in this way, an expansion of the fuel bed takes place to such extent that the mass of coked fuel is bound tightly to the side walls of the magazine, with the result that the mass of unburned coke is held against falling as the fire burns out underneath. This has the effect of leaving this mass of unburned coke considerably above the lower combustion zone, and the fire eats into this mass of suspended fuel from the bottom in such fashion that it is very difficult to control the rate of combustion. Experiments with more than one conventional prior design have indicated that the suspended coke will not fall down into the combustion zone until it is about two-thirds consumed, unless it is poked down by an operator, which is not an easy thing to do.

One of the primary objects of this invention is to provide a magazine feed stove, for bituminous coal particularly, that avoids the quick driving off of the volatile matter in a way that is inefficient and also creates an excess of smoke. This invention permits the main body of the fuel in the magazine to remain unvolatilized for a long period of time with a gradual discharge of volatile gases from this main body of fuel, whereby the heat value of this volatile matter can be obtained by the normal processes of combustion, and, finally, it provides means by which the fuel in the hopper is sufficiently freed from the side walls of the magazine to fall down on the fuel bed as fast as the lower parts of the fuel in the hopper are consumed.

In the preliminary stages wherein heat normally reaches to the fuel in the magazine to some extent, the bituminous coal forms a sticky tar compound which causes it to adhere to the side walls of the magazine, but this in time will burn away; and at this latter stage the sticking of the fuel to the side walls is due principally to the pressure exerted by the expansion of the fuel during the coking process.

The objects of this invention are accomplished, *according to one embodiment* by admitting primary air to the sides of the magazine throughout the major portion of the height thereof to produce heating of the peripheral portion of the column of fuel, liberating the volatile gases therefrom, and also supporting combustion of the peripheral portion of the fuel, which keeps the column of fuel burned away from the side walls as combustion progresses, thus preventing sticking to the walls, and causing the fuel to settle down gradually during the combustion process.

Since it is difficult to furnish an adequate supply of primary air to reach all of the volatiles and coke in the fuel column, provision is made for admitting a secondary air supply to the combustion zone. Thus any volatiles or gases which reach this point in the bottom flue in an unburned state, due to a lack of the necessary oxygen, are thereby supplied with secondary air for complete consumption thereof, causing complete combustion of the fuel.

Both primary and secondary air are preheated when admitted to the stove, thereby aiding combustion, and both may be controlled so as to regulate the burning of the volatiles, reducing these as much as required to obtain complete combustion. Since free gases are not thereby given off, but are substantially consumed, this results in the discharge of substantially no smoke. Therefore, it is substantially a smokeless stove.

A preferred embodiment of the invention is shown in the accompanying drawings, together with modifications thereof, in which.

Figure 1:
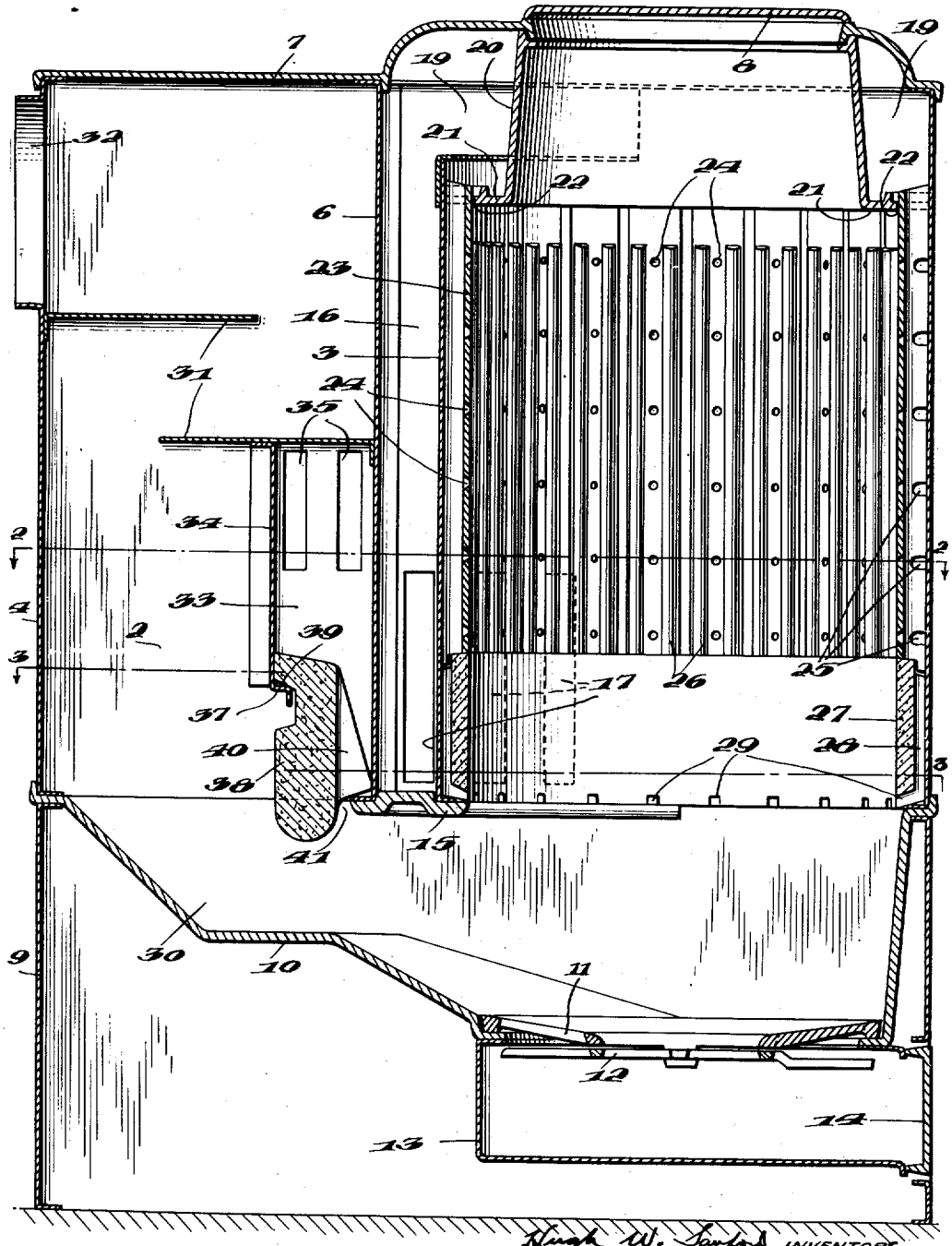
Fig. 1 is a vertical sectional view through the stove.

The invention is shown as applied to a magazine heating stove constructed with a fuel magazine designated generally by the numeral 1 adapted to receive a quantity of fuel, such as coal, therein necessary to support combustion. The magazine 1 is formed and enclosed by members 23, hereinafter described. A heating and combustion chamber 2, is disposed beside the fuel magazine, as shown particularly in Figs. 2 and 3.

The fuel magazine 1 is constructed with a surrounding drum 3, shown as of sheet metal, and having a heating drum 4, attached to opposite sides thereof by seams 5. The heating drum 4 has a partition 6, extending transversely thereof between the heating chamber 2 and the fuel magazine 1. A cover 7 extends over the drums 3 and 4 and forms the top of the stove. The top 7 has a feed opening therein over the magazine 1 which is provided with a lid 8 for closing the same.

Supporting the drum 3 that encloses the fuel magazine 1, and the heating drum 4, is a base 9, within which is mounted a base casting 10 which extends transversely beneath the fuel magazine and the heating chamber, and is supported on the periphery of the base 9 intermediate the latter and the drums 3 and 4, as shown in Fig. 1.

Mounted within the base casting 10 beneath the fuel magazine 1, is a rotary ash grate 11, beneath which is supported a draw-center ash dump 12 within an ash pit 13. The rotary ash grate 11 and ash dump 12 are of conventional construction, designed for turning movement in shaking down the ashes into the ash pit 13, while the ash dump 12 is adapted to be withdrawn for dumping the entire contents of the fuel magazine. The ash pit 13 has a door 14 in air-tight sealing relation therewith at the periphery of the base 9 adapted for opening movement for access to the ash pit 13.

Figure 2:
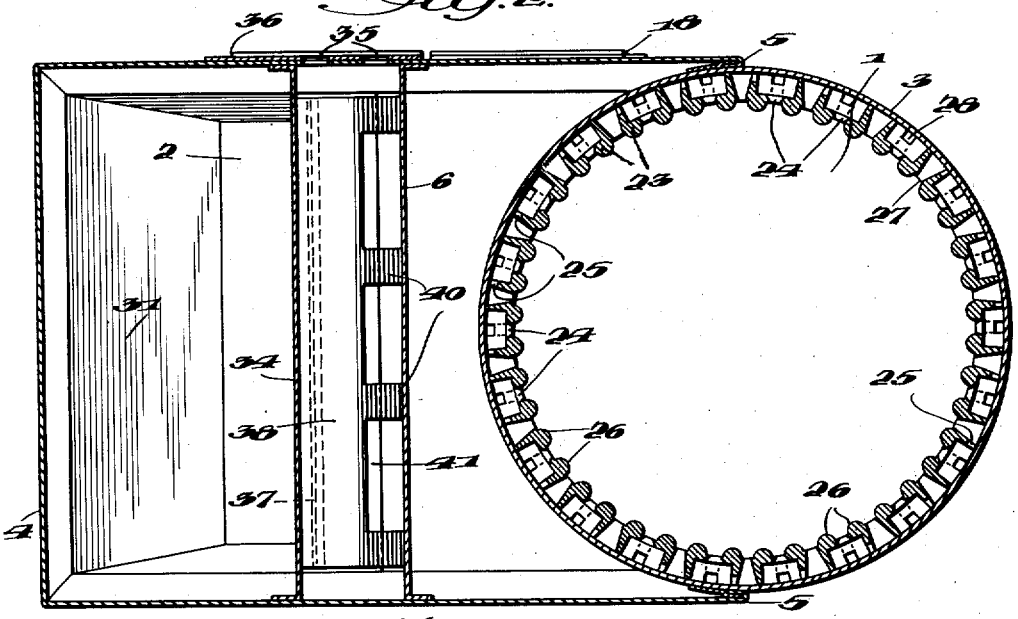
Fig. 2 is a horizontal sectional view therethrough on the line 2—2 of Fig. 1.
Figure 3:
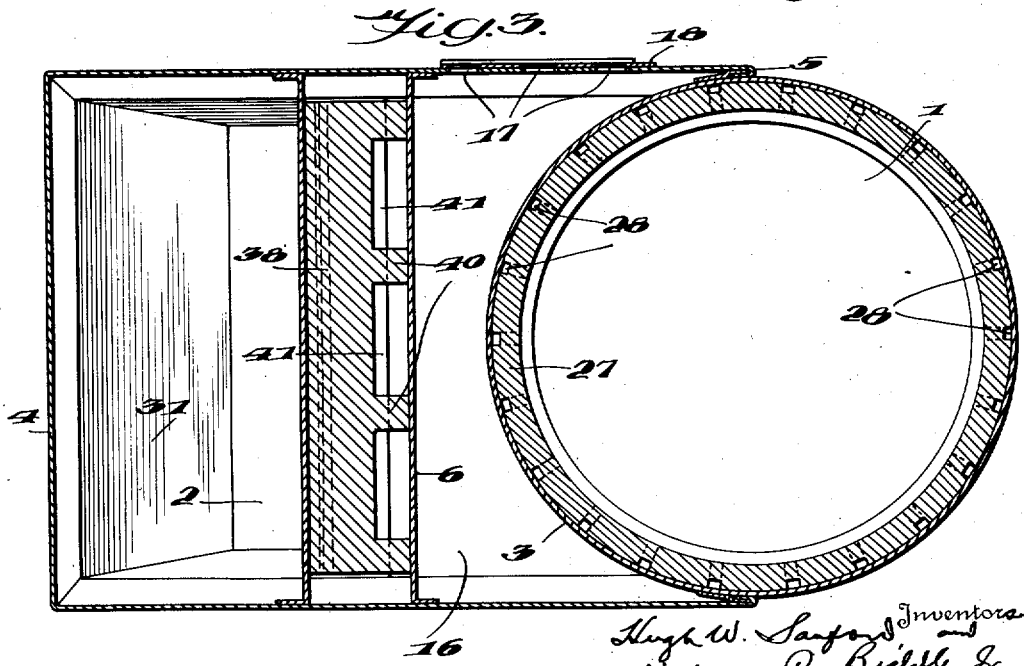
Fig. 3 is a similar view on the line 3—3 of Fig. 1.

The base casting 10 has a transverse supporting bar 15 extending thereover in bridging relation, one side of which is in sealing relation with the lower edge of the partition 6. The opposite edge of the bar 15 is in sealing relation with the lower edge of the drum 3 forming an air space 16 therebetween which partially surrounds the fuel magazine 1, as shown in Figs. 2 and 3, and within which air space the primary air may be preheated. Air is admitted to the air space 16 through openings 17 in one side of the drum 4, which openings are controlled by a slide damper 18 (Fig. 3).

The upper end of the air space 16 is in open communication with a distributing duct 19 that surrounds a dome 20. The dome 20 extends downwardly from the fuel opening in the top 7 into the upper end of the drum 3, and has a laterally extending flange 21 thereon, extending outwardly to the drum 3 and secured thereto for supporting the dome 20.

The flange 21 on the bottom edge of the dome 20, is provided with a plurality of notches 22 in the periphery thereof at spaced intervals around the drum 3, each of which notches has a channel member 23 extending downwardly theretrough. A series of channel members 23 is thus provided surrounding and enclosing the fuel magazine 1 and forming the surrounding wall thereof, as shown in Fig. 2. Each of these channel members is constructed preferably of a channel bar, and is slidably received in the notch 22 for expansive action under heat, or for ready removal and replacement when desired. The channel shape of each bar 23 forms a passageway therethrough, which is adapted to have communication with the fuel magazine 1 through orifices 24 formed at intervals in the inner wall of said channel and through orifices 25 in one of the lateral flanges thereof. The orifices 24 and 25 are arranged at intervals along the length of each channel 23, as shown in Fig. 1, to admit air from the passageway through the channel into the fuel magazine 1 at the periphery of the latter.

The channel bars 23 are spaced relatively close together, as shown in Fig. 2, so that lumps of coal will not get into the [space] *elongated opening* therebetween and thereby the orifices 25 will be effective to supply air to the periphery of the column of fuel, even if the orifices 24 should be closed by the lodging of fuel therein. However, ribs 26 extend lengthwise on each channel bar 23 on opposite sides of the row of orifices 24 therein to keep the coal from lodging in the orifices, plugging them up, or from lying flat thereagainst. Any fine coal that should pass through the air orifices 24 will fall downward through the channel bars 23 into the ash pit at the bottom, thus keeping these air passageways clear.

The lower ends of the channel bars 23 are supported on the upper edge of a fire-brick ring 27, which is seated in turn upon the base casting 10, or carried thereby. The fire-brick 27 has a series of grooves 28 extending lengthwise thereof, forming air passageways in alignment and open communication with the passageways through the channel bars 23. The lower ends of the *grooves or* passageways 28 are turned inward to the inner surface of the fire-brick 27, forming air jets 29 around the periphery of the column of fuel in the fuel magazine 1.

The fuel magazine is adapted to contain a column of fuel therein, rising from the ash grate 11, with the primary burning zone located at the lower portion of said column of fuel. Extending laterally therefrom in the base casting 10 is a bottom flue 30 entirely above the ash grate 11, the outer end of which flue 30 is in open communication with the heating and combustion chamber 2. Said heating and combustion chamber 2 has transversely overlapped baffles 31 therein, as shown in Fig. 1, with a flue outlet 32 at one side of the upper end thereof.

Provision is made for admitting secondary air to the burning zone at the bottom flue 30 for complete combustion of any volatiles, gas or fuel, at this point, aiding particularly in the combustion of the volatile matter that remains in the fuel when the latter has reached the combustion zone and there discharges the volatile gases. For this purpose, a preheating chamber 33 is provided between the partition 6 and an auxiliary partition 34, as shown in Figs. 1 and 2. The preheating chamber 33 has air inlets 35 at one end thereof controlled by a register 36 of the slide valve type (Fig. 2).

The auxiliary partition 34 is provided with a ledge 37 at the lower edge thereof for supporting a fire-brick baffle 38 thereon, which fire-brick 38 has a shoulder 39 along one edge thereof in position to seat upon the ledge 37. The opposite side of the fire-brick 38 has a plurality of ribs 40 seated upon a shoulder formed by the [connecting] *supporting* bar 15. This holds the fire-brick baffle 38 with the side wall thereof spaced from the adjacent edge of the transverse supporting bar 15, with secondary air outlet openings 41 therebetween for admitting secondary air from within the preheating chamber 33 into the top of the flue 30 substantially at the burning zone. This mounting for the fire-brick baffle 38 permits it to be lifted upward in the chamber 33 and turned laterally on the ledge 37, swinging its lower edge to the left in Fig. 1, thus releasing the ribs 40 from their supported positions on the adjacent edge of the bar 15, which permits the fire-brick baffle 38 to be withdrawn. Replacement of this fire-brick may be necessary at intervals, and this may be done by reversing the process thus described in removing the old one.

Figure 4:
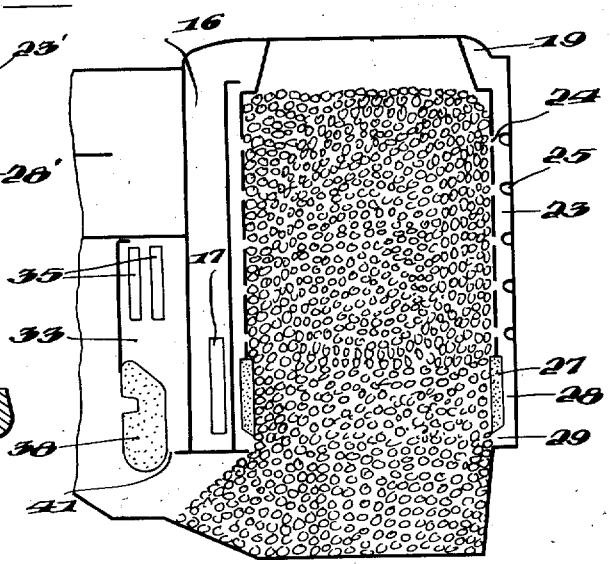
Fig. 4 is a diagrammatic view showing the magazine filled.

In operation, it will be evident that the fire may be started in any convenient manner. For instance, the kindling material is placed on the grate 11 and the fire started and then the fuel magazine 1 is filled with coal, substantially full, as illustrated generally in Fig. 4. The kindling may be ignited through the ash pit 13 and grate 11, and this causes a burning of the coal in the fuel column. The main burning zone will extend from the grate 11 upwardly substantially to the upper portion of the fire-brick 27, as shown generally by the fine dotted lines at the bottom in Fig. 5. Primary air to support combustion in this zone is drawn inward through the jets 29 from the passageways in the channels 23.

With the shutters or slide valves 13 and 36 open, as shown in Figs. 2 and 3, air will be drawn into the preheating chambers 16 and 33. From the chamber 16, this air will pass around through the primary air distributing duct 19, thence into the channels 23 and downwardly therethrough, discharging in the jets 29 at the lower ends thereof. A part of this primary air is admitted also through the orifices 24 and 25 in the surrounding wall of the fuel magazine to the periphery of the column of fuel.

Figure 5:
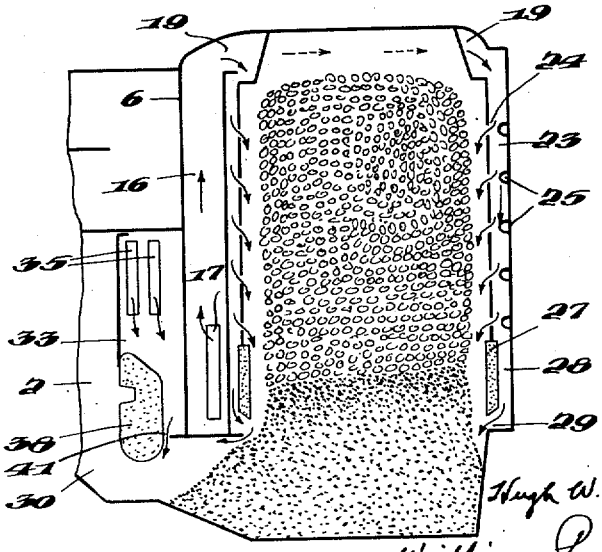
Fig. 5 is a similar diagrammatic view during the partial combustion of the fuel.

As these channels direct heat upward from the primary burning zone to heat the peripheral portion of the column of fuel, this peripheral portion will volatilize gases, the burning of which will be supported by the air admitted thereto through the orifices 24 and 25. This burns away the column of fuel at its periphery from the inner portions of the channels 23, as indicated in Fig. 5, and prevents the column of fuel from sticking to the periphery of the fuel magazine 1. This peripheral burning of the volatiles occurs while the center portion of the column of fuel is substantially cool, below 900° F., so that it does not volatilize its gases appreciably.

This makes it possible for the fuel column to settle downward as it is consumed at the bottom, making it unnecessary for the fuel to be broken down with a poker, because it is not held in bridging relation against the side walls of the fuel magazine by sticking thereto, as in prior magazine feed stoves. This combustion of the fuel at the sides of the fuel magazine automatically compensates for the swelling action when the coal is coked, and its settling down gradually maintains a solid burning zone at the bottom of the column.

Figure 6:
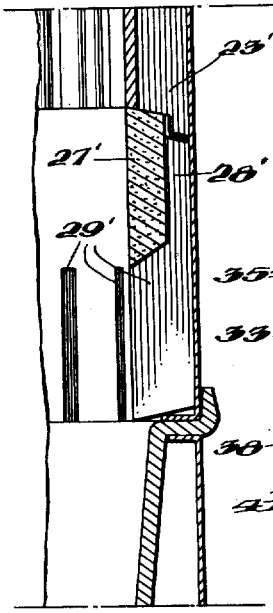
Fig. 6 is a detail vertical section showing a modified form of primary air supply.

Since it is not possible for an adequate supply of air to reach all of the volatiles and coke in the fuel column, a secondary air supply is provided by the preheating chamber 33. This secondary air is admitted to the burning zone through the openings 41 at a point where combustion occurs. In this manner, any volatiles or gases which reach this point in the bottom flue 30, are supplied with the necessary oxygen in the secondary air, so they will be burned, and consumption thereof will be complete. The hot products of combustion pass up through the heating chamber 2, around the baffles 31 and out through the flue opening 32, giving up their heat to the side walls of the heating chamber 2, in passing therethrough. Due to the consumption of substantially all of the volatiles or gases, substantially no smoke results from the operation of the stove, after it is started. Therefore, it is truly a smokeless heater in which maximum efficiency is obtained by reason of the consumption of all of the gases, even though soft coal is used.

Where lump coal is used as the fuel being burned in the fuel magazine, this does not cake in the fuel bed to the extent that is encountered in using smaller sizes of coal. For that reason, the orifices 24 and 25 may be omitted, if desired, as shown in Fig. 6, the primary air passing through channel passageways 23′ and passageways 28′ in the fire-brick 27′, being discharged at the inner face of the latter through slots 29′ of larger size than the jets 29 in Fig. 1. The slots 29′ will supply the primary air for combustion in the burning zone.

Where relatively fine fuel is used, to prevent the suspension of the unburned fuel in the magazine with rigid side walls, it is found necessary to provide primary air which tends to burn away the fuel that is in contact with the side walls of the magazine and leave an open space between the main bulk of the fuel in the magazine and the side walls in such fashion that this unburned fuel will settle down into the combustion zone at a rate that corresponds with the combustion of the fuel in the regular combustion zone. When, however, a large amount of lump coal is used, it is found that contacts between the particles of coal are insufficient to cause the fuel mass to stick together and heat in such fashion as to prevent the settling down of unburned fuel, provided that the intake of primary air takes place only a relatively few inches above the fuel actually being consumed.

It is also difficult to maintain a smokeless combustion while providing for two different combustion rates. For example, if the air supply to the stove is sufficient to consume six pounds of coal per hour at maximum burning capacity, then to reduce the air sufficiently to burn only one and one-half pounds per hour, the heat of the fuel bed will be proportionately less, being then below 1300° F., the temperature needed for complete burning of gas and volatile matter of most bituminous coal.

This is accomplished in the present invention by the manner of admitting air to the column of fuel in the magazine and the way in which the combustion is accomplished. The bottom of the column of fuel in the magazine is coked as a result of the manner in which the air is admitted. If the primary air be reduced, this will pass through the fuel bed at the point where there is the least resistance to its passage, at the bottom, where the combustion will take place. Then when the amount of air is increased, the additional air will pass into the magazine at higher points about the circumference thereof, effecting a burning away of the fuel at the periphery of the fuel column.

The low points where the primary air is admitted on reduced draft, are the outlets designated 29, and when the draft is increased, the air will be admitted successively at higher points through the orifices 24 and 25. This is an important feature of the invention, whereby the air is admitted to the column of fuel about the periphery of the latter and passes down the side of this column penetrating into it only slightly, and in such fashion as to burn the part of the column of fuel immediately at the surrounding wall which would otherwise stick to the wall and prevent the automatic lowering of the column as combustion takes place.

The entire column of fuel does not burn because the primary air is drawn down about the periphery thereof without substantial penetration, not being passed directly through the center of the column, and no primary air being drawn in from the bottom up into and through the column of fuel. Thus the fuel column will burn only at the points where primary air is admitted to substantial extent, namely, at the bottom of the column and immediately surrounding the periphery thereof, and the primary air will pass out through the flue 30 at the bottom, drawing off the liberated combustible gases from the fuel. Sufficient secondary air is admitted at the point *of opening* 41 to support combustion in said flue and in the combustion chamber 2, for complete consumption of these gases before they are discharged from the stove. This results in a completely smokeless stove since substantially no combustible particles are discharged through the flue thereof.

In admitting the primary air at this low point in the stove, while the ash pit is sealed at 14 as described above, there is substantially no tendency for any of the gases of combustion to escape when the main top 8 is substantially removed because there is no upward draft through the mass of fuel in the magazine. Furthermore, there is substantially no escape of gases of combustion when the ash pit door 14 is opened because of the manner in which the air is drawn in at the side and the low point of admission.

The air chambers 16 and 33 allow the pre-heating of the primary and secondary air supplies before the air is admitted to the stove, and these air chambers serve also to insulate the combustion and heating chamber 2 from the fuel magazine. The relatively narrow passageway through which the secondary air is admitted to the flue 30 at 31 provides a very simple and effective manner of admitting secondary air behind the baffle formed by the fire brick 38 which will cause the secondary air to mingle with the gases of combustion so as to complete the combustion of such gases and thus avoid smoking by the stove. The downward projection of the fire brick baffle or arch 38 into the flue 30 also tends to prevent the fuel from working its way into the combustion chamber 2, and increases the velocity of the gases passing through the flue by reducing the cross sectional area of the latter, whereby no fly-ash lodges on the arch in a way that would be detrimental through accumulative effect.

Two different designs are described herein where the magazine has rigid side walls ,one being illustrated in Figs. 1 to 5, and the other in Fig. 6. In actual practice with this invention, using ordinary nut and slack bituminous coal, it has been found that in the design shown in Figs. 4 and 5 of the drawings, we can fill up the magazine with bituminous coal, after having started a fresh fire, and we will have smoke for about fifteen to twenty minutes, but the percentage of smoke is very small, and it will pass the tests of the usual smoke ordinances in cities that are trying to eliminate smoke from the air. Furthermore, this original firing, since it takes place usually only once or twice during the winter months, is relatively inconsequential. We have proved that when the fire is burning continuously and the magazine is filled up with bituminous coal that after the fire has burned down close to the combustion chamber, the original smoke from the fresh fuel supply lasts only about four or five minutes and is in a negligible quantity, and thereafter the operation is substantially smokeless.

After starting a fresh fire with a magazine full of soft coal, we have found out that only about twenty to twenty-five per cent of the volatile matter is discharged from the fuel, even when the combustion rate is high, during the first hour. The rest of the volatile in the unburned fuel substantially remains until the fuel has reached the fire zone, where the volatile matter remaining is consumed along with the solid fuel. With this invention it has been proven that the central volume of the fuel in the magazine remains relatively cool and below the temperature that would cause the volatile to be discharged.

Therefore, this invention provides a magazine stove that is substantially smokeless with ordinary grades of bituminous coal of the size of nut and slack, ordinary stoker sizes, or larger; that is exceedingly efficient; in which the volatile matter is burned mostly along with the solid fuel itself; and a design in which the combustion rate of the fuel can be controlled readily. It has been found that the stove will idle and keep the fire alive for as long as seventy-two hours with one hundred pounds of nut and slack *coal* originally put into the magazine, and that at any time during this period the fire can be made to supply its maximum heat very shortly after damper regulation giving the required amount of primary air for full combustion.

If desired, a hot water heater may be utilized in connection with this stove, by providing a water back around the air passageways, or in place of the fire-brick 27, in a manner that will be obvious.

Figure 7:
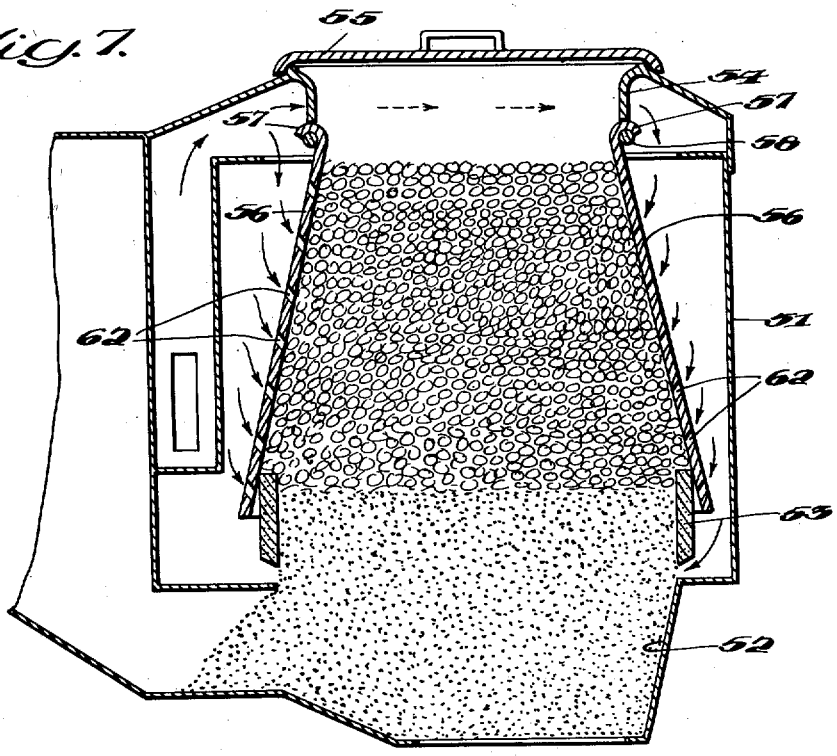
Fig. 7 is a vertical section through a stove having a modified form of magazine.
Figure 8:
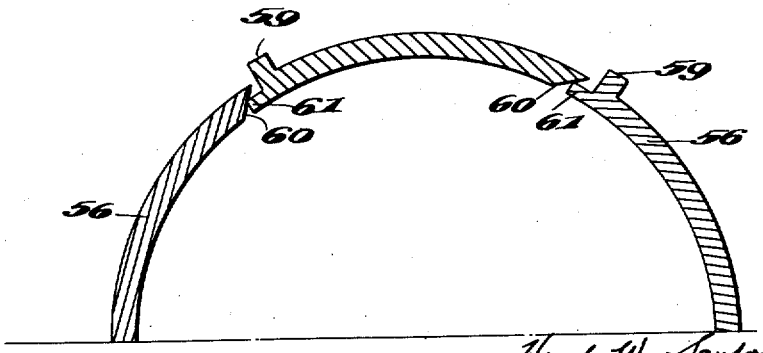
Fig. 8 is a horizontal section therethrough.

Provision may be made in the stove for relieving the side pressure on the magazine walls mechanically, so as to let the coke bed settle down as fuel is consumed in the combustion zone, as shown in Figs. 7 and 8. In this form, the magazine drum 51 is constructed with a combustion zone 52 in the lower portion thereof, having the usual grate at the bottom, and surrounded by a fire-brick ring 53 at the lower end of the fuel magazine. A filling opening is formed within a dome 54, having a removable cover 55.

The side walls of the magazine are formed of a plurality of metal plates 56, preferably of cast iron, which extend downward in truncated conical form, within the drum 51. The upper ends of the plates 56 are formed with hooks 57 which engage over a surrounding ring 58 carried by brackets attached to the dome 54, thus pivotally supporting the plates thereon in downwardly inclined directions, with the lower ends of the plates 56 bearing upon the upper edge of the fire-brick ring 53. The angle of the plates 56 to the vertical axis should be such that the plates will hold the side pressure of fresh fuel supply, but will swing outward in a laterally expanding action when the heat of combustion in the stove causes a swelling action of the coal.

The plates 56 are provided with ribs 59 extending vertically along edges thereof, and these edges are arranged in overlapping relation, as shown in Fig. 8. The edge of one plate 56 is beveled at 60, forming a feathered edge thereon, in position to overlap an angular corner 61 on the adjacent section, which arrangement effectively seals the joint therebetween, substantially preventing fine coal from passing through the joint, but if any coal should work through, it would drop into the combustion zone. The shape of this joint between the sections will tend to prevent the collection of any fine coal therein, as well as any undue leakage resulting from the lateral expansion of the plates 56, due to the swelling action of the heated coal in the magazine.

The plates 56 are shown as formed with holes 62 therethrough for admitting primary air around the outer portion of the fuel magazine, as well as at the bottom edge of the fire-brick ring 53, if desired, to keep the fuel bed burned away from the plates as described above. However, it may not be necessary to provide such air holes throughout the major portion of the height of the fuel magazine, especially where the expanding walls of the fuel magazine are used as shown in Figs. 7 and 8, which will allow the fuel bed to settle down in the combustion zone as the coal is burned therein. Nevertheless, it is desirable to admit the primary air to the fuel bed above the combustion zone, in order to obtain a substantially smokeless stove, in addition to the admission of some primary air through the fuel being consumed in the combustion zone. Such an arrangement causes burning of the volatiles, as they are released by the heated coal in the fuel bed, and yet the volatiles are not expelled too rapidly, but pass through the combustion zone gradually.

We claim:

1. A process of burning bituminous coal in a stove having a fuel magazine with surrounding walls, comprising supplying a column of fuel in the fuel magazine, [producing a layer of incandescence by primary combustion of the fuel in a zone adjacent the lower end portion of the fuel magazine,] introducing the primary air into the magazine only above the lower end of the fuel column at the periphery thereof with a portion of said primary air introduced adjacent [the] *a* zone of primary combustion *at the lower end of the fuel magazine, producing a layer of incandescence by primary combustion of the fuel in said zone, and the remainder of the primary air being* introduced at the periphery of the fuel column along a substantial portion of the height thereof to supply oxygen to support combustion at the periphery of the fuel column with substantially no combustion in the center of the said column of fuel at the same level, whereby before combustion takes place in the center of the fuel column the periphery of the column at this same level is burned away from the surrounding walls in a fashion that permits the fuel column as a whole to settle down into the combustion zone as the fuel therein is consumed.

2. A magazine feed stove comprising a fuel magazine structure adapted to contain a column of fuel therein with a zone of primary combustion at the bottom thereof, a bottom structure for supporting the column of fuel in the magazine, a bottom flue extending laterally from the fuel magazine and having an intake end connected with the magazine at the zone of primary combustion for discharge of the products of combustion through the bottom flue, means for admitting primary air into the fuel magazine at the periphery thereof *only above the bottom structure* adjacent the zone of primary combustion, means for supplying air to the fuel magazine spaced above said primary air admitting means, and means for supplying secondary air to the bottom flue to support secondary combustion of the products of combustion passing therethrough.

3. A magazine feed stove comprising a fuel magazine structure adapted to contain a column of fuel therein with a zone of primary combustion at the bottom thereof, a bottom structure for supporting the column of fuel in the magazine, a bottom flue extending laterally from the fuel magazine and having an intake end connected with the magazine at the zone of primary combustion for discharge of the products of combustion through the bottom flue, means for supplying secondary air to the bottom flue to support secondary combustion of the products of combustion passing therethrough, means [for admitting] *above said bottom support for admitting the primary air to the fuel magazine at the periphery thereof adjacent the zone of primary combustion and substantially entirely above the bottom support of the fuel column* to support said primary combustion, and additional means spaced above said primary air admitting means for supplying air to the periphery of the fuel magazine above the zone of primary combustion to supply oxygen to support combustion at the periphery of the fuel column with substantially no combustion at the center of said column of fuel at the same level, whereby before combustion takes place in the center of the fuel column the periphery of the column at this same level is burned away from the surrounding walls in a fashion that permits the fuel column as a whole to settle down into the combustion zone as the fuel therein is consumed.

4. A magazine heating stove comprising a fuel magazine having surrounding walls adapted to contain a fuel column in the magazine, a fuel-supporting bottom structure beneath the magazine for supporting the fuel column for primary combustion of the fuel in a zone above the fuel-supporting means, means for supplying primary air to the periphery of the fuel column adjacent the zone of primary combustion from a space externally of the fuel column to support the primary combustion, and means *closely spaced* for introducing primary air into the fuel magazine substantially throughout the periphery thereof and [along] *substantially throughout* the height of the fuel column, said primary air admitting means being arranged to supply the primary air to the fuel magazine directly from externally of the fuel magazine without passing through the fuel magazine to support combustion at the periphery of the fuel column causing the fuel to be burned away from the surrounding walls and to settle down as fuel is consumed therebelow in the zone of primary combustion.

5. In a magazine-feed stove, the combination of a fuel magazine for containing a column of fuel, means for supporting the column of fuel in the magazine and arranged to provide a zone of primary combustion at the lower end of the fuel magazine, means forming a continuous substantially imperforate wall about the periphery of the fuel magazine adjacent the lower end thereof and having constricted orifices at the lower end thereof for admitting air into the zone of primary combustion, means forming openings at the periphery of the fuel magazine substantially throughout the height thereof for admitting air into the periphery of the fuel magazine from externally thereof, means forming one or more air spaces about the fuel magazine in communication with the openings and orifices for supplying air to said openings and orifices, said orifices being of appreciably smaller air capacity than the air space or air spaces in communication therewith, means for directing the products of combustion laterally from said zone of primary combustion, and means for admitting secondary air to said last-mentioned means to support secondary combustion therein.

6. A magazine-feed stove comprising a fuel magazine structure adapted to contain a column of fuel therein with an incandescent layer at the bottom thereof, a grate structure for supporting the column of fuel in the magazine with the incandescent layer directly above the grate, a bottom flux extending laterally from the fuel magazine and having an intake end connected with the magazine entirely above the grate in position for discharge of the gaseous products of combustion through the flue above the grate, means for admitting primary air to the periphery of the fuel magazine [through] *and having constricted orifices through which said air is admitted* directly above the intake end of the flue in close proximity therewith, means for supplying air to the periphery of the fuel magazine along the height of the column of fuel therein and including openings disposed substantially throughout the periphery of the fuel magazine, means externally of the fuel magazine for supplying air directly to the orifices and openings without passage through said magazine, and means for supplying secondary air to the bottom flue to support secondary combustion of the products of combustion passing therethrough.

7. A magazine-feed stove comprising a fuel magazine structure adapted to contain a column of fuel therein, said magazine structure having a surrounding wall adapted to enclose the fuel column, a bottom fuel-supporting structure at the lower end of said wall adapted to confine a combustion zone therein adjacent the bottom end of the magazine structure, said wall having vertical air passages therein with slots connected therewith and extending upwardly in the fuel magazine substantially throughout a major portion of the height of said magazine, said air passages being closed externally and extending downwardly directly to the combustion zone and having air inlets into the magazine at the combustion zone of appreciably smaller capacity than said air passages, and means for supplying air into the upper ends of said passages independently and externally of the fuel magazine without passing through said magazine for flow through said passages directly to the inlets at the combustion zone and for flow through said slots for admitting air therefrom into the periphery of the fuel magazine.

8. A stove comprising a magazine structure having a grate for supporting a column of fuel therein, conduit means for supplying primary air to said fuel column, including means *spaced above the fuel column supporting grate* for supplying air to one end thereof, and said conduit means having constricted orifices capable of discharging therefrom a portion of the total primary air of the stove when the draft through said conduit means is fully open, and a flue having unrestricted communication with the magazine structure for directing products of combustion therefrom, said constricted orifices being arranged for introducing the constricted supply of primary air to the vertical outside wall of the fuel column adjacent to the unrestricted flue leading therefrom, *the means for supplying the primary air to the fuel column including the orifices being substantially entirely above the fuel column supporting grate,* whereby when the draft is reduced appreciably from the full draft of normal combustion the said primary air supply introduced through the orifices to the periphery of the fuel column will enter the magazine structure and produce combustion of the periphery of the fuel column with sufficient temperature to consume the gaseous products of combustion producing a smokeless operation at such a reduced rate of combustion.

9. A stove comprising a fuel magazine structure *having a fire zone at the lower end thereof,* a bottom structure for supporting the fuel in the magazine structure, conduit means having damper control means therefor and constructed for supplying downwardly moving primary air substantially to the entire perimeter of the fuel column in the magazine structure, a flue connected with the magazine structure adjacent the bottom structure for drawing the gaseous products of combustion laterally from a substantially uninterrupted portion of the perimeter of the fuel column, said flue having the intake thereof extending circumferentially of the fuel column less than one-half of the total perimeter thereof, said conduit means having one or more constricted ports in the magazine structure above the lower end thereof for directing the flow of primary air against the perimeter of the fuel column and having one or more additional ports thereto in position to be adjacent the fire pone, said [port or] ports being [so located and] *extended substantially along the height of the magazine structure and spaced about the perimeter thereof and so* constricted that upon full opening of the damper means for maximum capacity a major portion of the primary air is directed to the perimeter of the fuel column above the fire zone and when the stove is being operated at a low heating capacity the major part of the primary air passes through the conduit means to the constricted port or ports at the bottom of the magazine structure and directly above the entrance to said flue, whereby the perimeter of the burning fuel column adjacent thereto is supplied with sufficient primary air to promote full consumption of the fuel at this point.

10. A down-draft magazine-feed heating stove comprising a fuel magazine structure for containing a column of fuel therein, said structure having an opening at the top thereof for supplying fresh fuel by gravity to the magazine structure, a closure for said opening and constructed for sealing said opening against the entrance of air therethrough when the closure is in place over the opening, a bottom structure including a grate for supporting the fuel in the magazine structure and including de-ashing means for separating ashes from the column of fuel, and an ash pit below said fuel supporting means, means for gaining access into the ash pit to remove the ashes therefrom and including an opening and a cover therefor constructed for sealing the opening substantially against the entrance of air thereto when the cover is in place, said closure and cover being constructed to prevent the admission of air to the fuel magazine and ash pit during operation except when fuel is being supplied to the magazine or ashes are being taken out, means for introducing primary air into the magazine structure at points wholly above the level of the bottom structure, and a flue extending laterally from the fuel magazine in communication therewith above the grate for conveying the gaseous products of combustion laterally away from the burning fuel, the air supply and air introducing means being constructed for introducing at least a major portion of the primary air to the perimeter of the fuel column at points substantially above the level of the horizontal plane of the top of the flue adjacent the fuel column, means for introducing secondary air into said flue, and separate means for controlling the primary and secondary air introduced by the respective means.

11. A magazine-feed stove comprising a fuel magazine structure adapted to contain a column of fuel therein with an incandescent layer at the bottom thereof, a bottom fuel-supporting structure for supporting the fuel in the magazine structure with the incandescent layer directly above said bottom structure, a flue for conveying off the gaseous products of combustion and having an intake end connected with the magazine structure wholly at a point above the bottom structure in position for the discharge of gaseous products of combustion entirely above the bottom structure, *means closely spaced for admitting air to substantially the entire periphery of the fuel column substantially throughout the height thereof*, and means for supplying primary air to the magazine structure and opening into the magazine structure directly above and in close proximity with the intake end of the flue, said air supplying means having an intake end substantially [at the same level as the incandescent layer of fuel] at the bottom of the magazine structure, *whereby said air supply means will be at the same level as the incandescent layer of fuel during combustion in the stove.*

12. A down-draft magazine-feed stove comprising a magazine structure for containing a column of fuel therein, a bottom fuel-supporting structure for supporting the fuel in the magazine structure, a combustion chamber beside the magazine structure and spaced laterally therefrom, means for insulating the combustion chamber from the magazine structure, a bottom flue for conveying the gaseous products of combustion laterally from the magazine structure entirely above the bottom fuel-supporting structure to the combustion chamber, and means for supplying to the magazine structure all of the primary air at the peripheral portion of the magazine structure at points [above the bottom fuel-supporting structure, said air supply means being constructed with means for admitting air at a combustion zone adjacent the bottom of the fuel magazine and arranged for passage of air externally of the fuel magazine to said air admitting means, whereby the temperature of the fuel] *above the bottom fuel-supporting structure, said air supply means being constructed with means for supplying air at a combustion zone adjacent the bottom of the fuel magazine and means arranged for passage of air externally of the fuel magazine in heat exchange relation therewith to the respective air supplying means, whereby the temperature of the fuel* in the upper part of the magazine structure is maintained by said air sufficiently low to prevent the fuel from expanding and adhering to the side walls of the magazine structure.

13. A down-draft magazine-feed heating stove comprising a fuel magazine for containing a column of bituminous coal therein, a de-ashing bottom structure for supporting the coal in the magazine structure, an ash pit below said de-ashing structure for receiving the ashes therethrough, said ash pit having an access opening thereto, a cover for closing said opening against the admission of air therethrough, and means for supplying primary air downwardly in the fuel magazine throughout a substantial portion of the height thereof and having an opening into the magazine directly above the bottom structure and including a conduit extending thereto, means forming an exit flue and open to the magazine structure at a side thereof entirely above the de-ashing bottom in such position that none of the gaseous products of combustion pass through the de-ashing structure in moving to the exit flue, said air supply conduit having an air inlet located adjacent to a horizontal plane through the top of the bottom structure [in such position that there will be no tendency for back draft upwardly through the fuel zone of gaseous products of combustion from the magazine when the ash pit closure is opened].

14. In a magazine heating stove, the combination of a fuel magazine adapted to contain a column of fuel therein, a combustion chamber spaced laterally from the fuel magazine, a bottom flue extending between the lower end portions of the fuel magazine and the combustion chamber and in open communication therewith for directing combustible gases from said magazine to said chamber, an air chamber having means for admitting air thereto on a horizontal level at the lower portion of the fuel magazine and above the bottom flue, means for circulating primary air from said air chamber downwardly externally of the fuel magazine about the periphery thereof and admitting said *primary* air to the magazine at a plurality of points along the height thereof and *substantially entirely above the lower end of the fuel column and* adjacent the first-mentioned air admitting means to support combustion in said magazine and around the walls thereof.

15. In a magazine heating stove, the combination of a fuel magazine adapted to contain a column of fuel therein, a combustion chamber spaced laterally from the fuel magazine, a flue extending between the lower end portions of the fuel magazine and the combustion chamber and in open communication therewith for directing combustible gases from said magazine to said chamber, means for admitting *the* primary air to the fuel magazine about the periphery thereof and at a plurality of points along the height thereof *substantially entirely above the lower end of the fuel column* to support combustion in said magazine and around the walls thereof, said air admitting means being constructed of constricted orifices and having downwardly extending passageways communicating with the orifices at a series of vertically spaced points about the magazine.

16. In a magazine heating stove, the combination of a fuel magazine adapted to contain a column of fuel therein, a combustion chamber spaced laterally from the fuel magazine, a flue extending between the lower end portions of the fuel magazine and the combustion chamber and in open communication therewith for directing combustible gases from said magazine to said chamber, means for admitting primary air to the fuel magazine about the periphery thereof and at a plurality of points along the height thereof to support combustion in said magazine and around the walls thereof, said air admitting means being constructed of constricted orifices and having downwardly extending passageways communicating with the orifices at a series of vertically spaced points about the magazine with the lowermost orifices spaced above the flue, and means for admitting primary air into the upper ends of said passageways for downward circulation therethrough to the orifices.

17. In a magazine heating stove, the combination of a fuel magazine adapted to contain a column of fuel therein, a combustion chamber spaced laterally from the fuel magazine, a flue extending between the lower end portions of the fuel magazine and the combustion chamber and in open communication therewith for directing combustible gases from said magazine to said combustion chamber, an air chamber interposed between the fuel magazine and the combustion chamber and extending substantially from side to side thereof insulating said magazine and combustion chamber from each other, means for admitting cold air into said air chamber at a point adjacent the bottom of the fuel magazine, and means for circulating air from the top of said air chamber above the magazine downwardly externally of the air chamber about the periphery of the magazine to a point adjacent the bottom thereof.

18. In a magazine heating stove, the combination of an upright fuel magazine adapted to contain a column of fuel therein, a grate at the bottom of the fuel magazine substantially within the confines of the wall thereof for supporting said column of fuel, an upright combustion chamber disposed beside the fuel magazine and spaced bodily therefrom, a flue extending laterally between the lower ends of the fuel magazine and combustion chamber and in open communication therewith only above the grate arranged for passage of gaseous products of combustion to the flue entirely above the grate without passing downward through the grate, means for admitting *the* primary air to the fuel magazine at a point wholly above said flue to support combustion in the bottom of said magazine and at higher points at the periphery of the fuel magazine below the top thereof for discharging combustible gases through said flue and to cause settling down of bituminous coal in the fuel magazine without adhering to the surrounding wall of the magazine, and means for admitting secondary air into the top of said flue for combustion of said gases.

19. In a magazine heating stove, the combination of an upright fuel magazine adapted to contain a column of fuel therein, an upright combustion chamber disposed beside the fuel magazine and spaced bodily therefrom, a flue extending laterally between the lower ends of the fuel magazine and combustion chamber and in open communication therewith, means for admitting *the* primary air to the fuel magazine at a point wholly above said flue to support combustion in the bottom of said magazine and for discharging combustible gases through said flue, a baffle extending transversely of said flue and projecting downwardly [below] *from* the top thereof, and means for admitting secondary air into the top of said flue beside said baffle and between said baffle and the fuel magazine for causing intermixing of said air with the combustible gases.

20. A magazine-feed stove comprising a magazine structure for containing a column of fuel, said magazine structure including a plurality of upright channel members arranged at *closely spaced* intervals about the periphery of the fuel magazine [with] *and thereby forming elongated* openings between the channel members [forming] *constituting* air passageways in open communication with the interior of the magazine structure, said channel members having means of communication from the [air passageways therein] *interiors thereof* into the openings, and means for supplying air into said channel members.

21. A magazine-feed stove comprising a magazine structure for containing a column of fuel, said magazine structure including a plurality of upright channel members arranged at intervals about the periphery of the fuel magazine with said channel members spaced apart to provide spaces therebetween with slots opening from said spaces into the periphery of the fuel magazine and said slots being elongated in an upward direction throughout a substantial portion of the height of said magazine, the sides of the channel members at opposite sides of the spaces converging toward said slots inwardly relative to the magazine, so that lumps of coal that may pass through the slots will not clog the spaces, and means for admitting air into said spaces for supply to the fuel magazine.

22. A magazine feed stove comprising a fuel magazine for containing a column of fuel therein and having a surrounding wall structure, said wall structure including a plurality of channel members arranged about the periphery of the fuel magazine, each of said channel members having *an air passageway therethrough and having* means of communication from the air passageway extending therethrough into the fuel magazine, said channel members being spaced apart with the spaces therebetween open into the fuel magazine and having means of communication through the side walls thereof from the air passageways into said spaces.

23. A magazine feed stove comprising a fuel magazine for containing a column of fuel therein and having a surrounding wall structure, said wall structure including a surrounding enclosure, a plurality of channel members spaced at intervals about the enclosure, each of said channel members having an inner wall facing the interior of the magazine with side flanges directed toward the enclosure and forming an air passageway therethrough extending lengthwise of the fuel magazine, a fire-brick extending about the lower portion of the fuel magazine and having passageways therethrough in alignment with the channel passageways in open communication therewith and extending to points within the fuel magazine for supplying air to the column of fuel therein.

24. A magazine feed stove comprising a fuel magazine for containing a column of fuel therein and having a surrounding wall structure, said wall structure including a surrounding drum, a plurality of channel members spaced at intervals about the drum, each of said channel members having an inner wall facing the interior of the magazine with side flanges directed toward the drum and forming an air passageway therethrough extending lengthwise of the fuel magazine, a fire-brick lining extending about the fuel magazine and supporting the channel members thereon, said fire-brick lining having grooves therein in alignment with the passageways in the channel members in open communication therewith, and extending to the inner surface of said lining for supplying air to the column of fuel in the magazine, and means slidably receiving and mounting the channel members in upright positions within the drum.

25. A magazine feed stove comprising a fuel magazine for containing a column of fuel therein and having a surrounding enclosure, a heating structure disposed beside the fuel magazine and connected with the first-mentioned enclosure, a partition extending transversely of the heating structure forming a preheating chamber between said partition and the magazine enclosure having means for admitting air thereto, said fuel magazine having a plurality of air inlets about the periphery thereof, means forming one or more passageways extending downwardly to said air inlets from the upper end portion of said magazine enclosure and being in open communication with the preheating chamber.

26. A magazine feed stove comprising a fuel magazine for containing a column of fuel therein and having a surrounding wall structure, a heating structure connected with the wall structure and extending laterally therefrom enclosing a heating chamber, a partition extending transversely of the heating structure spaced from the wall structure forming a preheating chamber therebetween having an air inlet, means connected with said preheating chamber for supplying air therefrom through the wall structure to the inner periphery of the fuel magazine for supporting combustion therein, a flue connecting the lower end portions of the fuel magazine and the heating chamber, and means for admitting secondary air to said flue intermediate the fuel magazine and the heating chamber.

27. A magazine feed stove comprising a fuel magazine for containing a column of fuel therein, a heating structure disposed beside the fuel magazine, means forming a flue connecting the lower end portion of the fuel magazine with the heating structure, and secondary air supply means intermediate the heating chamber and the fuel magazine, said air supply means including wall structures enclosing an air preheating chamber, one of said wall structures having a ledge connected therewith and the opposite wall structure having a shoulder connected therewith, a fire-brick having one side seated on said ledge and having one or more ribs extending laterally from the opposite side thereof and seated on the shoulder for supporting the fire-brick therebetween, said shoulder having the inner edge thereof spaced from the adjacent side of the fire-brick forming on opening therebetween from the preheating chamber into the flue.

28. A magazine heating stove comprising means forming a combustion space, a fuel magazine thereabove adapted to contain bituminous coal and arranged for discharging the same by gravity into the combustion space automatically as fuel is consumed therein, and means for introducing primary air above the combustion space for downward movement thereto in part through the fuel supply in the magazine, whereby the down draft carries the volatile matter produced in the lower portion of the fuel supply into the combustion space without heating all of the fuel in the magazine sufficiently to volatilize it completely until it has reached a location adjacent the combustion space, said fuel magazine having side walls thereof constructed for lateral expansion *automatically under internal pressure* to reduce the pressure of the coal against said side walls when the coal is swelled by the heat of combustion in the stove, whereby the coal will settle by gravity into the combustion space as coal is consumed therein.

*29. A magazine feed stove comprising a fuel magazine structure adapted to contain a column of fuel therein with a zone of primary combustion at the bottom thereof, a bottom structure for supporting the column of fuel in the magazine, a bottom flue extending laterally from the fuel magazine and having an intake end connected with the magazine at the zone of primary combustion for discharge of the products of combustion through the bottom flue, means above said bottom support for admitting the primary air into the fuel magazine adjacent the zone of primary combustion and substantially entirely above the bottom support for the fuel column, means closely spaced for supplying air to the periphery of the fuel magazine substantially throughout the height thereof at a point spaced above said primary air admitting means, and means for supplying secondary air to the bottom flue to support secondary combustion of the products of combustion passing therethrough.*

*30. A magazine feed stove comprising a fuel magazine structure adapted to contain a column of fuel therein with an incandescent layer at the bottom thereof, a bottom fuel-supporting structure for supporting the fuel in the magazine structure with the incandescent layer directly above said bottom structure, a flue for conveying off the gaseous products of combustion and having an intake end connected with the magazine structure wholly at a point above the bottom structure in position for the discharge of gaseous products of combustion entirely above the bottom structure, and means above the bottom support for supplying the primary air to the magazine structure, said means including means for supplying a relatively small percentage of primary air under maximum draft condition to the magazine structure at a point adjacent a horizontal plane through the magazine structure in close proximity to the intake end of the flue, and additional means closely spaced for admitting air to the periphery of the fuel column substantially throughout the height thereof said air supplying means having an intake end substantially at the bottom of the magazine structure and extending from said intake end in heat exchange relation with the magazine to preheat the air before supplying said air to the first-mentioned point of admission of primary air to the magazine structure.*

*31. A down-draft magazine-feed heating stove comprising a fuel magazine structure for containing a column of fuel therein, said structure having an opening at the top thereof for supplying fresh fuel by gravity to the magazine structure, a closure for said opening and constructed for sealing said opening against the entrance of air therethrough when the closure is in place over the opening, a bottom structure including a grate for supporting the fuel in the magazine structure and including de-ashing means for separating ashes from the column of fuel, and an ash pit below said fuel supporting means, means for gaining access into the ash pit to remove the ashes therefrom and including an opening and a cover therefor constructed for sealing the opening substantially against the entrance of air thereto when the cover is in place, said closure and cover being constructed to prevent the admission of air to the fuel magazine and ash pit during operation except when fuel is being supplied to the*

*magazine or ashes are being taken out, means for introducing primary air into the magazine structure at points wholly above the level of the bottom structure, and a flue extending laterally from the fuel magazine in communication therewith above the grate for conveying the gaseous products of combustion laterally away from the burning fuel, the means for introducing the primary air to the magazine being disposed wholly above the top of said flue, the air supply and air introducing means being constructed for introducing a portion of the primary air to a side of the fuel column opposite from the entrance of the flue, and means for introducing secondary air into said flue.*

*32. In a heating stove for burning solid fuel, a magazine structure adapted to contain a column of fuel therein and having a bottom structure at the lower end of the magazine structure for supporting the column of fuel thereon for combustion of the fuel thereabove, means forming an ash-pit beneath the magazine bottom structure and constructed substantially to close the magazine against the entrance of primary air through the ash-pit into the magazine structure, means forming a discharge flue for the gaseous products of combustion from the lower portion of the magazine structure to one side thereof, means for supplying the primary air to the fuel magazine wholly above said flue and having one or more ports into the magazine substantially opposite from the flue and above the top of the flue constructed for admitting a substantial portion of the primary air under maximum operating conditions, and the hot gases of combustion pass transversely across and above the bottom structure and through the fuel supported thereon to the discharge flue.*

*33. In a heating stove for burning solid fuel, a magazine structure adapted to contain a column of fuel therein and having a grate at the lower end of the magazine structure for supporting the column of fuel therein, means forming an ash-pit beneath the grate and constructed substantially to close the grate against the entrance of primary air through the ash-pit and the grate into the magazine structure, said grate being located adjacent the bottom of the stove for combustion of the fuel in a combustion zone thereabove, means forming a discharge flue for the gaseous products of combustion from the lower portion of the fuel magazine and extending laterally from a side of the fuel magazine, and means for supplying the primary air to the fuel magazine wholly above said flue at the combustion zone and having ports leading into the combustion zone which are spaced an appreciable distance above the uppermost level of the grate and above the top of the flue whereby the hot gases do not tend to pass downward through said grate, and wherein all of the primary air follows the path of least resistance to reach the flue by either passing through the fuel in the combustion zone or passing around the perimeter of the fuel in the combustion zone and wherein, when the stove is running at a fair heating capacity, a substantial part of the primary air that is introduced to the combustion zone above the grate passes transversely across through the fuel towards and into the oppositely disposed flue for taking away the gaseous products of combustion.*

*34. In a heating stove for burning solid fuel, a magazine structure adapted to contain a column of fuel therein and having a grate at the lower end of the magazine structure for supporting the column of fuel therein, means forming an ash-pit beneath the grate and constructed substantially to close the grate against the entrance of primary air through the ash-pit and the grate into the magazine structure, said grate being located adjacent the bottom of the stove for combustion of the fuel in a combustion zone thereabove, means for supplying primary air to the fuel magazine and having one or more ports into the magazine spaced an appreciable distance above the uppermost level of the grate, whereby the hot gases of combustion do not tend to pass downward through said grate and substantially all of the air passes transversely across above the grate either through the fuel supported thereon or around the perimeter of the fuel thereon in the combustion zone, means forming a discharge flue for the gaseous products of combustion from the lower portion of the fuel magazine at the side thereof substantially opposite at least some of said ports, the means for introducing the primary air to the magazine being disposed wholly above the top of said flue, said flue having an entrance to the magazine structure of appreciable area such that the burning fuel and ashes in the combustion zone tend to spread out sidewise into the flue in the direction of flow therethrough, and the lower portion of the flue being substantially imperforate and extending upwardly and forwardly away from the plane of the top surface of the grate.*

*35. In a heating stove for burning solid fuel, a magazine structure adapted to contain a column of fuel therein and having a grate at the lower end of the magazine structure for supporting the column of fuel therein, means forming an ash-pit beneath the grate and constructed substantially to close the grate against the entrance of primary air through the ash-pit and the grate into the magazine structure, said grate being located adjacent the bottom of the stove for combustion of the fuel in a combustion zone thereabove, means for supplying primary air to the fuel magazine and having one or more ports into the magazine spaced an appreciable distance above the uppermost level of the grate, whereby the hot gases of combustion do not tend to pass downward through said grate and substantially all of the air passes transversely across and above the grate either through the fuel supported thereon or around the perimeter of the fuel in the combustion zone, means forming a discharge flue for the gaseous products of combustion from the lower portion of the fuel magazine at the side thereof substantially opposite at least some of said ports, the means for introducing the primary air to the magazine being disposed wholly above the top of said flue, said flue having a lower wall laterally of the grate substantially imperforate whereby there is no tendency for the hot gases to pass downward through said grate and pass across underneath the grate and up into the flue, and to confine the gaseous products of combustion to discharge above the grate through the flue.*

*36. In a stove for burning solid fuel, a magazine structure adapted to contain the fuel, a grate substantially at the bottom of the magazine structure, means forming an ash receiving space below the grate inside the stove and for closing said space substantially against the entrance of outside air through the space to the grate, means forming a smoke discharge opening for the stove, a flue connected with said opening and extending thereto from the bottom portion of the fuel magazine, said grate being adapted to support the fuel in the magazine with a fuel burning zone adja-*

*cent the grate, the flue being connected with the magazine structure and extending laterally from a side of the magazine structure the grate and above the grate, means for supplying primary air to the magazine structure substantially at the top of the burning zone of the fuel in position for passage of the air around and directly through the burning fuel and into the flue without passage of said primary air downward through the grate, and additional means for supplying air to the major portion of the periphery of the fuel magazine for a substantial distance above the grate to support combustion at the periphery and prevent sticking of the fuel to the magazine.*

*37. In a stove for burning solid fuel, a magazine structure adapted to contain the fuel, a grate substantially at the bottom of the magazine structure, means forming an ash receiving space below the grate inside the stove and for closing said space substantially against the entrance of outside air through the space to the grate, means forming a smoke discharge opening for the stove, a flue connected with said opening and extending thereto from the bottom portion of the fuel magazine, said grate being adapted to support the fuel in the magazine with a fuel burning zone adjacent the grate, the flue being connected with the magazine structure at a point adjacent the grate and above the grate, means for supplying primary air to the magazine structure substantially at the top of the burning zone of the fuel in position for passage of the air around and directly through the burning fuel and into the flue without passage of said primary air downward through the grate, said flue adjacent the grate having substantially an imperforate lower portion tending to prevent the passage of air through the grate and beneath the latter into the flue at a point spaced laterally of the grate in such fashion that under normal working conditions there will be a greater resistance to the travel of the draft down through and back up through the openings in the grate than there will be for the movement in the draft through the burning fuel in a line leading directly from the air admitting means to the flue and whereby the volume of the cross draft through the fuel is not appreciaby reduced by being diverted through the grate, and additional means for supplying air to the major portion of the periphery of the fuel magazine for a substantial distance above the grate to support combustion at the periphery and prevent sticking of the fuel to the magazine.*

*38. In a stove for burning solid fuel, a magazine structure adapted to contain the fuel, a grate substantially at the bottom of the magazine structure, means forming an ash receiving space below the grate inside the stove and for closing said space substantially against the entrance of outside air through the space to the grate, means forming a smoke discharge opening for the stove, a flue connected with said opening and extending thereto from the bottom portion of the fuel magazine, said grate being adapted to support the fuel in the magazine with a fuel burning zone adjacent the grate, the flue being connected with the magazine structure at a point adjacent the grate and above the grate, means for supplying primary air to the magazine structure wholly above the top of the flue and substantially at the top of the burning zone of the fuel in position for passage of the air around and directly through the burning fuel and into the flue without passage of said primary air downward through the grate, said flue having a bottom portion sloping upwardly in the direction away from the grate.*

*39. In a stove for burning solid fuel, a magazine structure adapted to contain the fuel, a grate substantially at the bottom of the magazine structure, means forming an ash receiving space below the grate inside the stove and for closing said space substantially against the entrance of outside air through the space to the grate, means forming a smoke discharge opening for the stove, a flue connected with said opening and extending thereto from the bottom portion of the fuel magazine, said grate being adapted to support the fuel in the magazine with a fuel burning zone adjacent the grate, the flue being connected with the magazine structure at a point adjacent the grate and above the grate, means for supplying primary air to the magazine structure substantially at the top of the burning zone of the fuel in position for passage of the air around and directly through the burning fuel and into the flue without passage of said primary air downward through the grate, and means for admitting additional primary air to the burning zone within the bottom portion of the magazine structure and intersecting the first mentioned primary air within the burning zone, the means for introducing the primary air to the magazine being disposed wholly above the top of said flue.*

*40. In a stove for burning solid fuel, a magazine structure adapted to contain the fuel, a grate substantially at the bottom of the magazine structure, means forming an ash receiving space below the grate inside the stove and for closing said space substantially against the entrance of outside air through the space to the grate, means forming a smoke discharge opening for the stove, a flue connected with said opening and extending thereto from the bottom portion of the fuel magazine, said grate being adapted to support the fuel in the magazine with a fuel burning zone adjacent the grate, the flue being connected with the magazine structure at a point adjacent the grate and above the grate, means for supplying primary air to the magazine structure substantially at the top of the burning zone of the fuel in position for passage of the air around and directly through the burning fuel and into the flue without passage of said primary air downward through the grate, means for admitting additional primary air to the burning zone within the bottom portion of the magazine structure and intersecting the first mentioned primary air within the burning zone, the means for introducing the primary air to the magazine being disposed wholly above the top of said flue, and means for introducing secondary air into the gaseous products of combustion created within the burning zone by the respective sources of primary air, whereby smoke within the products of combustion will be substantially eliminated.*

HUGH W. SANFORD.
WILLIAM P. BIDDLE, JR.

REFERENCES CITED

The following references are of record in the file of this patent or the original patent:

UNITED STATES PATENTS

| Number | Name | Date |
|---|---|---|
| 38,828 | Hunt | June 9, 1863 |
| 61,922 | Brown | Feb. 12, 1867 |

(Other references on following page)

UNITED STATES PATENTS

| Number | Name | Date |
|---|---|---|
| 114,260 | Bussey et al. | May 2, 1871 |
| 132,211 | La Rue | Oct. 15, 1872 |
| 356,686 | Hess | Jan. 25, 1887 |
| 434,403 | Rube | Aug. 12, 1890 |
| 529,072 | Hinstin | Nov. 13, 1894 |
| 552,911 | Knauss | Jan. 14, 1896 |
| 561,408 | Lynott | June 2, 1896 |
| 594,774 | Borman | Nov. 30, 1897 |
| 596,378 | Pampus | Dec. 28, 1897 |
| 604,991 | Litchfield | May 31, 1898 |
| 659,161 | Washburn | Oct. 2, 1900 |
| 711,627 | Heuer | Oct. 21, 1902 |
| 905,366 | Reck | Dec. 1, 1908 |

| Number | Name | Date |
|---|---|---|
| 1,501,847 | Howell | July 15, 1924 |
| 1,561,497 | Wier | Nov. 17, 1925 |
| 2,295,781 | Fellows et al. | Sept. 15, 1942 |
| 2,414,147 | Fleer | Jan. 14, 1947 |

FOREIGN PATENTS

| Number | Country | Date |
|---|---|---|
| 7,723 | Great Britain | July 29, 1887 |
| 32,965 | Austria | May 11, 1908 |
| 69,131 | Germany | June 3, 1893 |
| 118,469 | Germany | Mar. 7, 1901 |
| 131,699 | Germany | June 26, 1902 |
| 585,289 | Germany | Sept. 30, 1933 |